United States Patent
Tiirola et al.

(10) Patent No.: US 10,292,147 B2
(45) Date of Patent: May 14, 2019

(54) DOWNLINK CONTROL CHANNEL FOR SINGLE CARRIER TRANSMISSION

(71) Applicant: Nokia Solutions and Networks Oy, Espoo (FI)

(72) Inventors: Esa Tapani Tiirola, Kempele (FI); Kari Pekka Pajukoski, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 44 days.

(21) Appl. No.: 15/509,821

(22) PCT Filed: Sep. 15, 2014

(86) PCT No.: PCT/EP2014/069589
§ 371 (c)(1),
(2) Date: Mar. 8, 2017

(87) PCT Pub. No.: WO2016/041570
PCT Pub. Date: Mar. 24, 2016

(65) Prior Publication Data
US 2017/0295564 A1    Oct. 12, 2017

(51) Int. Cl.
*H04W 72/04* (2009.01)
*H04L 5/00* (2006.01)
*H04L 1/18* (2006.01)

(52) U.S. Cl.
CPC ......... *H04W 72/042* (2013.01); *H04L 1/1861* (2013.01); *H04L 5/0053* (2013.01); *H04W 72/0453* (2013.01)

(58) Field of Classification Search
CPC ............ H04W 72/042; H04W 72/0453; H04L 1/1861
See application file for complete search history.

(56) References Cited

U.S. PATENT DOCUMENTS

| 2004/0190482 A1* | 9/2004 | Baum ............... H04W 72/082 370/347 |
| 2012/0287882 A1* | 11/2012 | Kim ..................... H04L 5/0048 370/329 |
| 2013/0083666 A1 | 4/2013 | Gaal |

FOREIGN PATENT DOCUMENTS

| EP | 2739102 A1 | 6/2014 |
| WO | 2014019284 A1 | 2/2014 |

OTHER PUBLICATIONS

International Search Report and Written Opinion received for corresponding Patent Cooperation Treaty Application No. PCT/EP2014/069589, dated Jun. 16, 2015, 11 pages.

* cited by examiner

*Primary Examiner* — Jackie Zuniga Abad
(74) *Attorney, Agent, or Firm* — Squire Patton Boggs (US) LLP

(57) ABSTRACT

A method is provided comprising selecting (301), in a network node, a downlink control channel scheme comprising at least two control channel pools within predefined control symbols. The network node applies (302) time division multiplexing between different control channels and/or related control channel building blocks within each control channel pool. The network node applies (302) frequency division multiplexing between different control channels. The network node allocates (303) control channel resources for at least one control channel based on a control channel type and/or aggregation level.

19 Claims, 9 Drawing Sheets

DOWNLINK CONTROL CHANNEL FOR SINGLE CARRIER TRANSMISSION

RELATED APPLICATION

This application was originally filed as Patent Cooperation Treaty Application No. PCT/EP2014/069589 filed Sep. 15, 2014.

TECHNICAL FIELD

The invention relates to communications.

BACKGROUND

In LTE, a base station signals in each frame which user terminals are being allocated resources and the location within the frame of the associated data. This signalling may be performed over a physical downlink control channel (PDCCH). The amount of resources allocated to the PDCCH may be varied. If the allocated amount is too small, then the uplink and downlink data schedulers are not be able to schedule each user terminal that needs to be served. If the allocated amount is too large, then resources may be wasted.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
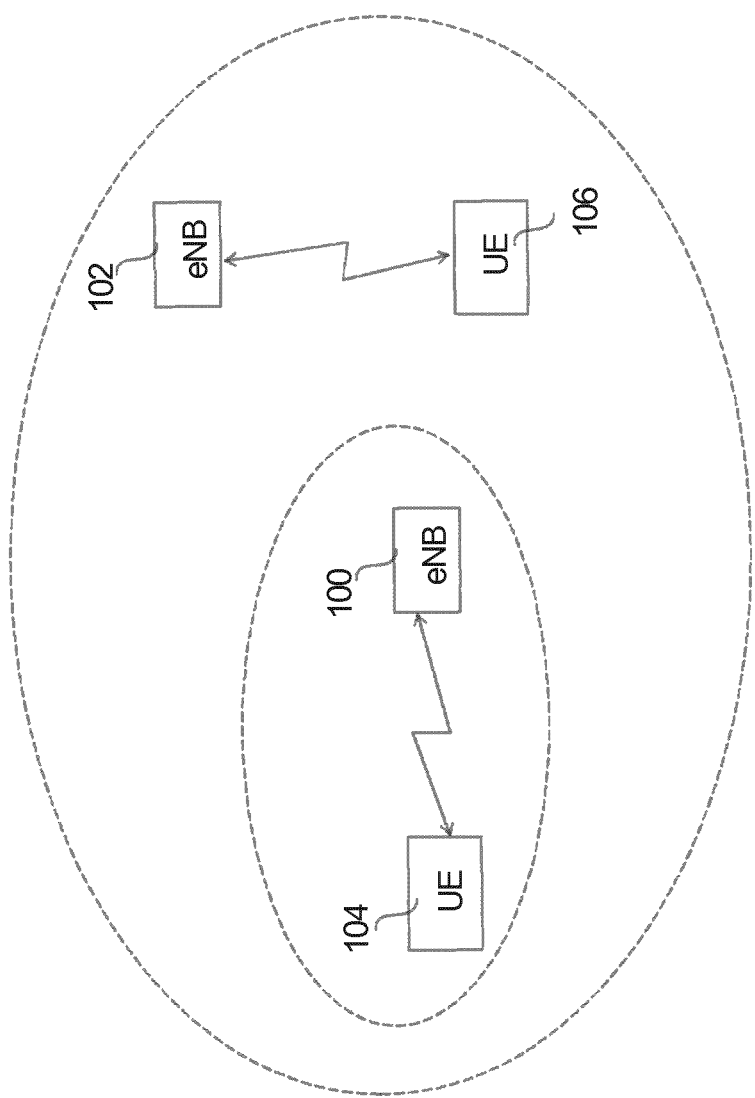
FIG. 1 is illustrates a wireless communication system to which embodiments of the invention may be applied.

FIG. 1 illustrates a wireless communication scenario to which embodiments of the invention may be applied. Referring to FIG. 1, a cellular communication system may comprise a radio access network comprising base stations disposed to provide radio coverage in a determined geographical area. The base stations may comprise macro cell base stations (eNB) 102 arranged to provide terminal devices (UE) 106 with the radio coverage over a relatively large area spanning even over several square miles, for example. In densely populated hotspots where improved capacity is required, small area cell base stations (eNB) 100 may be deployed to provide terminal devices (UE) 104 with high data rate services. Such small area cell base stations may be called micro cell base stations, pico cell base stations, or femto cell base stations. The small area cell base stations typically have significantly smaller coverage area than the macro base stations 102. The cellular communication system may operate according to specifications of the $3^{rd}$ generation partnership project (3GPP) long-term evolution (LTE) advanced or its evolution version.

The physical layer of LTE is built on top of OFDMA (for downlink) and SC-FDMA (for uplink) technologies. OFDMA enables flexibility in frequency domain multiplexing, inter-symbol-interference (ISI) free transmission, low-complexity reception (due to the fact that channel equalization may be made in subcarrier wise), and low-complexity MIMO extension. In addition to LTE downlink, OFDMA is adopted in many areas such as in digital TV (DVB-T and DVB-H) and wireless local area network (WLAN) applications. OFDMA involves high peak-to-average power ratio (PAPR) of a transmitted signal which requires high linearity in the transmitter. An amplifier is to stay in a linear area with the use of extra power back-off in order to prevent problems to the output signal and spectrum mask. The use of additional back-off leads to reduced amplifier power efficiency or smaller output power. This may cause the range to be shortened, or when the same average output power level is maintained, more energy is consumed due to higher amplifier power consumption. The power efficiency is a reason why 3GPP decided to use OFDMA in the downlink direction but to use the power efficient SC-FDMA in the uplink direction. The power efficiency is used as a design parameter for mobile devices running on their own batteries and having a limited transmit power. A cubic metric (CM) difference between SC-FDMA and OFDMA is summarized in Table 1 below, wherein CM difference represents the difference in required output back-off (OBO). The CM difference translates into a corresponding difference in link budget and energy consumption. CM is a good measure for power amplifier efficiency especially on the uplink side, whereas OBO is a better measure on the downlink side.

TABLE 1

| Modulation | CM difference |
|---|---|
| QPSK | 2.4 dB |
| 16QAM | 1.6 dB |
| 64QAM | 1.4 dB |

Regarding power efficiency in LTE DL, the output back-off (OBO) has a direct impact to energy consumption. For example, assuming that 80 W linearized power requires a power amplifier with an input power of 480 W (3×160 W). For typical 3-sector base stations with two power amplifiers per sector, the linearized output power per base station site is 6×80 W=480 W, and the input power per base station site is 6×3×160 W=2.88 kW, wherein 10 000 base station sites consume 28.8 MW. Thus, a 3 dB reduction in the output back-off reduces the power consumption per site by 1.44 kW.

LTE DL defines a reference design for DL control channels and their dimensioning for a cellular system. In an existing design, PCFICH defines the size of a control channel in terms of the number of OFDMA symbols. Different control channels are formed of a number of resource element groups (REG), also referred to as quadruplets. Each REG occupies four consecutive resource elements (resource elements for a reference signal are not included in REG). In a typical case, different channels (e.g. PCFICH) are formed of a predetermined number of non-adjacent (interleaved) REGs. PCFICH contains four REGs. The number of PHICH groups (defining the number of PHICH resources) is configured by means of a higher layer parameter. Each PHICH group contains 3 REGs (normal CP length). PDCCH is formed of one, two, four or eight control channel elements (CCE). Each CCE contains 9 REGs. LTE DL has been designed from a multicarrier system point of view. The existing design results in a high PAPR at a transmitter (and at a receiver). Hence, the LTE DL design is not usable as basis for single carrier DL.

Figure 2:
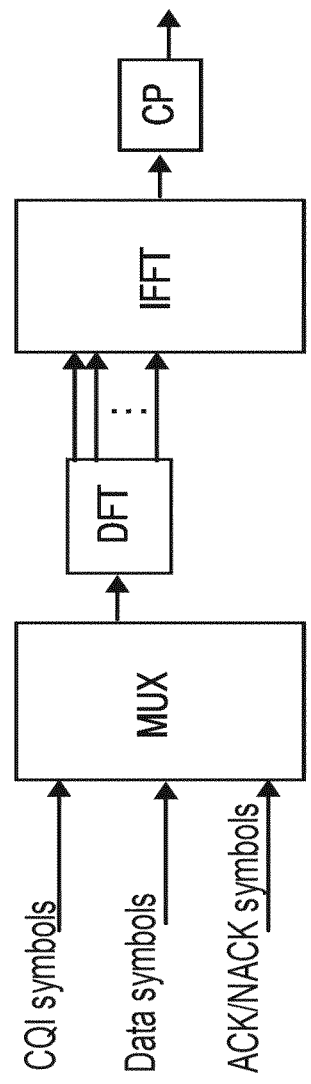
FIG. 2 illustrates data and control channel multiplexing within a SC-FDMA symbol block.

LTE UL multiplexing in a case where UCI (Uplink Control Information) such as HARQ-ACK and CSI is multiplexed with PUSCH within the sub-frame, is depicted in FIG. 2. FIG. 2 illustrates control and data multiplexing within a SC-FDMA symbol (block). In order to maintain single carrier properties of a transmitted signal, data and different control symbols are multiplexed prior DFT. Data and different control fields (ACK/NACK, CQI/PMI, rank indicator) are coded and modulated separately before multiplexing them into the same SC-FDMA symbol block. Using a selected symbol level multiplexing scheme, the ratio between the data symbols and control symbols is accurately adjustable within each SC-FDMA block. In the case of UCI on PUSCH with rank>1 (UL SU-MIMO defined in Rel-10), in an approach defined for ACK/NACK/RI, UCI is replicated to each layer, symbols are time-aligned, and layer/CW specific scrambling is performed. The approach defined for ACK/NACK/RI corresponds to rank=1 transmission with random pre-coding. In the case of UCI on PUSCH with rank>1 (UL SU-MIMO defined in Rel-10), in an approach defined for CQI/PMI, UCI is transmitted within one CW, and mapping onto two layers in the case of rank=3 and rank=4 is performed.

The single carrier UL scenario deals with multiplexing control and data. In DL side, multiplexing relates to control channels only (there is no motivation to convey data via control symbols in DL). The single carrier UL scenario deals with multiplexing control and data of the same UE. In the DL side, multiplexing relates to different UEs, more specifically to dedicated control channels and common control channels. The single carrier UL scenario, different UEs are multiplexed by using localized/clustered FDMA. In the DL side, different UEs are multiplexed by using TDM and IFDMA. The single carrier UL scenario does not deal with predefined control channel pools for different UE-specific operations such as PDCCH blind detection.

Assigning a separate OFDMA symbol for each control channel may be sufficient in the case when the number of UEs to be scheduled is low and/or when the number of OFDM(A) symbols available for control information is high. This may be the case e.g. in mmWave scenarios being considered for 5G. However, this is not the case in a wide area/cmWave scenario where the number of scheduled UEs (and parallel control channels) may be relatively high and the number of control symbols is relatively small (to minimize CP overhead).

Figure 3:
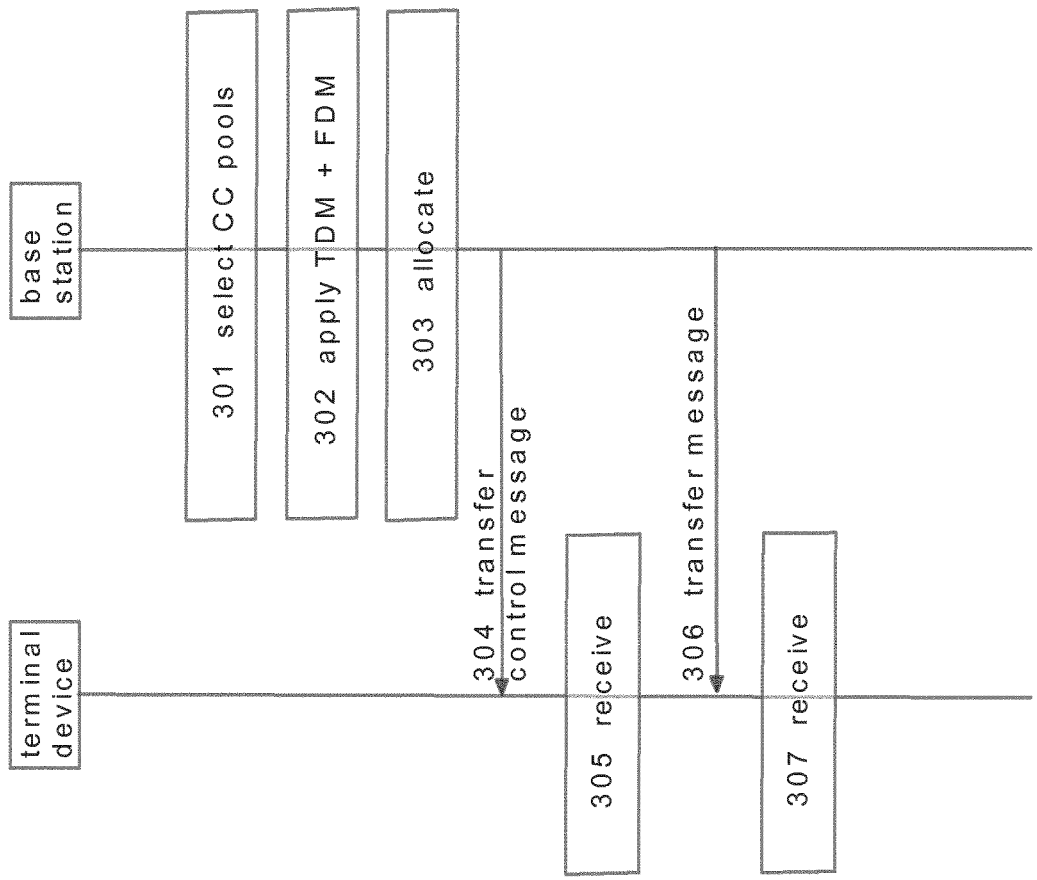
FIG. 3 is a signalling diagram of a procedure for determining a downlink control channel scheme for a terminal device according to an embodiment of the invention.

Let us now describe an embodiment of the invention for selecting and signalling link adaptation parameters with reference to FIG. 3. FIG. 3 illustrates a signalling diagram illustrating a method for communicating downlink control signalling between a base station of a cellular communication system, e.g. base station 100 or 102, and a terminal device of the cellular communication system, e.g. the terminal device 104 or 106. In another embodiment, the procedure of FIG. 3 may be carried out between the terminal device and an access node or, more generally, a network node. The network node may be a server computer or a host computer. For example, the server computer or the host computer may generate a virtual network through which the host computer communicates with the terminal device. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. Virtual networking may also be used for testing the terminal device.

Referring to FIG. 3, in block 301, the base station selects a downlink control channel scheme comprising at least two control channel pools within predefined control symbols. In block 302, the base station applies time division multiplexing (within the SC-FDMA symbol) between different control channels and/or related control channel building blocks within each control channel pool. Further, in block 302, the base station applies frequency division multiplexing between different control channel pools. In block 303, the base station allocates control channel resources for at least one control channel based on a control channel type and/or aggregation level. In step 304, the base station may cause transmission of a control message to a terminal device via one or more control channel pools. In block 305, the terminal device may acquire from the base station the control message transmitted via one or more control channel pools. The control message 304 may also convey information on the control channel pool(s). In step 306, the base station may cause transmission of one or more further messages to the terminal device by using a single carrier operation mode. In block 307, the terminal device may acquire from the base station the one or more further messages transmitted by using the single carrier operation mode. The one or more further messages may comprise a data signal, control signal, a reference signal, or a signal or message of any other suitable signal/message type.

In an embodiment, interleaved frequency division multiplexing is applied between different control channel pools (block 302).

In an embodiment, different DL control channels (both common and dedicated) are multiplexed within a control symbol block and among multiple antenna ports, while maintaining single carrier properties of the transmitted signals. The single carrier properties of the transmitted signals may be maintained by designing the transmission such that for each antenna port, only one modulated symbol is transmitted at a time.

Figures 4, 5:
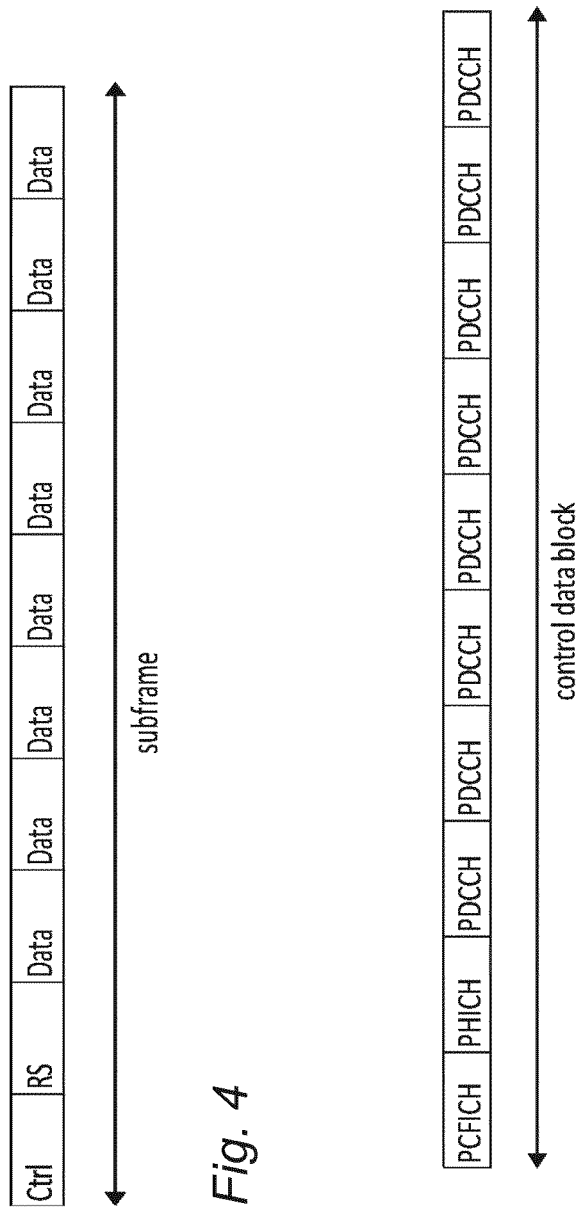
FIG. 4 illustrates exemplary symbol level multiplexing between a control channel, reference signal and data channel according to an embodiment of the invention.
FIG. 5 illustrates exemplary mapping of control channels within a resource pool according to an embodiment of the invention.

In an embodiment, SC-FDMA symbol level multiplexing between a control channel, reference signal (RS) and data channel is applied, one or more SF-FDMA symbols are allocated to the control part, and one or more SF-FDMA symbols are allocated to a reference signal (RS) part (see FIG. 4; for simplicity, the cyclic prefix that may be part of each symbol of the subframe is not shown in FIG. 4).

In an embodiment, each control channel (or corresponding CC building blocks) is mapped into a single resource pool similarly at each antenna port. Control channel pre-coding over the antenna ports is carried out in a predetermined manner. Time division multiplexing is applied between different control channels similarly for each antenna within each control channel pool, and pre-coding within the control channel pool is performed by defining that for each antenna port, only one modulated symbol is transmitted at a time. Pre-coding may include e.g. random pre-coding, long term pre-coding, or short term pre-coding. Pre-coding weights may be UE specific or channel specific.

In another embodiment, multiple resource pools are created within the available control symbols. Control channels (and/or corresponding CC building blocks) are mapped into the available resource pools in a predetermined way. There is a full flexibility in defining the control channel mapping separately within each resource pool. IFDMA may be used as a multiplexing scheme between the parallel resource pools. RPF is determined according to the number of parallel resource pools. The number of parallel resources pools is equal to or less than the number of antenna ports and/or Tx chains. A pre-coding operation (other than pre-coding with an identity matrix) is applied in case the number of parallel resource pools is smaller than the number of antenna ports. The pre-coding may include e.g. random pre-coding, long term pre-coding, or short term pre-coding. Pre-coding schemes maintaining single carrier properties of the transmitted signal are applied.

In an embodiment, diversity transmission (i.e. transmission of the same control data) over multiple resource pools is applied to increase the degree of antenna diversity as well as to boost the Tx power of certain control channels w.r.t. other control channels. This may be carried out within a single control channel pool by using multiple control symbols, or within multiple control channel pools by using a single control symbol, or within a combination of those.

In an embodiment, predetermined mapping for control channels or corresponding CC building blocks is applied within the control channel pool. A control channel structure (such as CCE/REG) is provided on top of at least two control channel pools. For example, the REG and/or CCE structure of LTE may be built on top of available resource elements in a predetermined way (to maximize utilization of the existing control channel framework). Different control channels/CCEs are arranged within the resource pool according to predetermined mapping principles. For example, the CC building blocks (i.e. REGs and/or CCEs) may be arranged in a similar manner in each control channel pool and/or antenna port. PDCCH search spaces (CSS, USS) are built on top of available CCEs. FIG. 5 illustrates an example of predetermined mapping.

In an embodiment, a control channel functionality (such as PDCCH, PHICH, PCFICH) is provided on top of a provided control channel structure (such as CCE, REG).

In an embodiment, the RS part is used as a reference signal to demodulate the control part, wherein IFDM is applied between the antenna ports and/or the control channel pools. An applied repetition factor (RPS) is dimensioned according to the number of control channel pools and/or the number of antenna ports applied.

Figure 6:
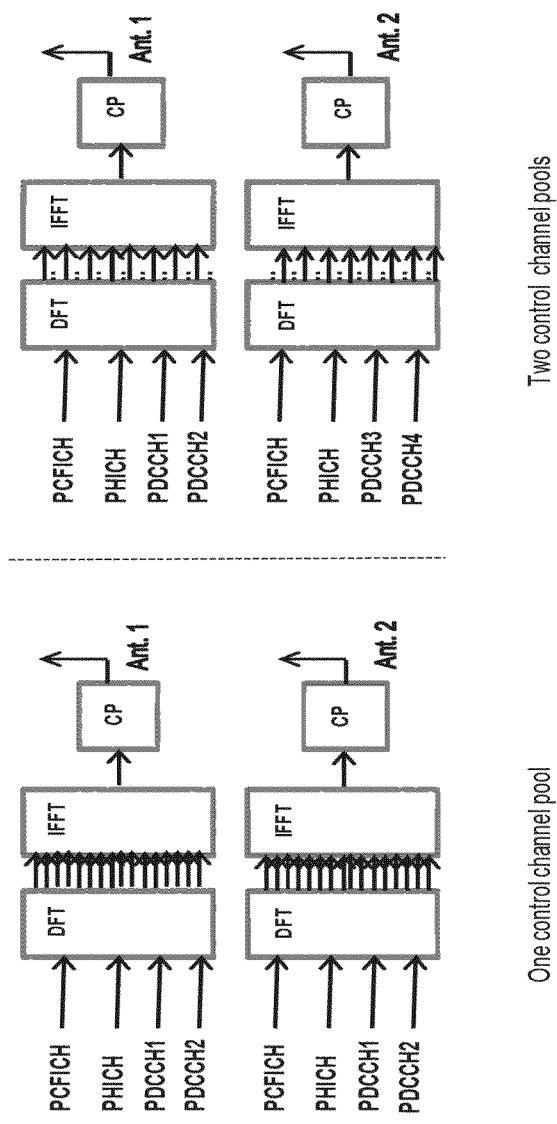
FIG. 6 illustrates an exemplary DFT-S-OFDMA implementation for multiplexing different control channels according to an embodiment of the invention.

FIG. 6 illustrates exemplary DFT-S-OFDMA realization of the multiplexing (alternatively, it is also possible to use time domain realization for the multiplexing). Three types of control channels are considered, namely PCFICH, PHICH and PDCCH. These control channels represent dedicated control channels transmitted for different UEs (PDCCH, PHICH) and common control channels transmitted for the entire cell or to a group of UEs (PCFICH, PDCCH). In the situation of FIG. 6, two antenna ports are assumed, having one or two control channel pools.

In the situation of FIG. 6, in case of one control pool, both antenna ports use the entire bandwidth available for control signalling (RPF=1). Similar control channel resources are configured for both antenna ports, and pre-coding maintaining low PAPR properties is applied. The pre-coding may be defined separately for different channels/UEs.

In the situation of FIG. 6, in case of two control channel pools, antenna port-specific resource pools are defined (RPF=2). Antenna port #1 occupies a first IFDMA comb, and antenna port #2 occupies a second IFDMA comb. In FIG. 6, Tx diversity is applied for PCFICH and PHICH (i.e. PCFICH and PHICH are transmitted via both resource pools). In FIG. 6, Tx diversity is not applied for PDCCH. In FIG. 6, pre-coding is not applied (as the number of antenna ports equals to the number of control channel pools).

In an embodiment, the provided control channel pools are configured via higher layer signalling and/or derived from the available information, such as broadcasted system information.

Table 2 illustrates exemplary control channel dimensioning 1) for LTE based on OFDMA downlink, and 2) for single carrier downlink (SC-DL). Both cases assume a bandwidth of 20 MHz and one symbol allocation for the control channel.

TABLE 2

|  | LTE | SC-DL |
|---|---|---|
| System bandwidth in PRBs | 100 | 100 |
| Number of OFDMA symbols for PDCCH [1, 2, 3, 4] | 1 | 1 |
| PHICH(Ng) - parameter defining the number of PHICH groups [1/6, 1/2, 1, 2] | 0.50 | 0.50 |
| Number of subcarriers or virtual subcarriers (total) | 1200 | 1200 |
| Number of subcarriers (CRS) - 2 antenna ports | 400 | 0 |
| Number of subcarriers (PCFICH) | 16 | 16 |
| Number of subcarriers (PHICH) | 84 | 84 |
| Number of subcarriers (PDCCH) | 700 | 1100 |
| Number of PDCCH REGs (4 subcarriers each) | 175 | 275 |
| Number of CCEs (9 REGs each) | 19.4 | 30.6 |
| Number of CCEs (9 REGs each) - rounded | 19 | 30 |

In an embodiment, LTE functionality on top of the single carrier downlink may be realized by defining that REG corresponds to four consecutive modulation symbols. It may be defined that CCE corresponds to nine REGs. Different control channels (comprised of REGs and/or CCEs) may be ordered within the control symbol in a predetermined way. An exemplary ordering may be as follows: 1. PCFICH, 2. PHICH, 3. PDCCH, 4. PDCCH.

In an embodiment, different control channels may be dimensioned according to predetermined rules. For example, PCFICH may contain 4 consecutive REGs, and a PHICH group may contain 3 consecutive REGs (there may be multiple PHICH groups defined). It is possible to apply separate coding for PHICH similarly as in existing LTE systems. Alternatively, there is a single resource space for PHICH, and joint coding is applied for multiple UEs within a PHICH group. In another alternative, joint coding is applied within the PHICH group (CDM multiplexing is applied in LTE). CCE may contain 9 consecutive REGs. There is no need for staggered allocation of different REGs in the single carrier approach.

In an embodiment, UE is made aware of the placement and size of each control channel it is to detect (e.g. blind decoding). For example, the base station may transmit information to UE on the placement and size of each control channel UE is to detect. This provides quite a similar functionality, e.g. in terms of PDCCH blind detection and adjusting the quality of different control channels, compared to what is being supported by LTE PDCCH (i.e. aggregation levels 1, 2, 4, 8). Furthermore, this enables capitalizing the antenna diversity required by the control channels and providing an opportunity for Tx power boost for certain control channels (e.g. for UEs located on the cell edge).

Table 3 illustrates an exemplary CCE/REG (CCE or REG) structure in case of 4 Tx chains/PA. In Table 3, it is assumed that each Tx chain occupies five CCE/REGs. In practice, there may be more CCE/REGs per each Tx chain, and they may be located on one or multiple control symbols.

TABLE 3

| CCE/REG structure, option 1 | | | | |
|---|---|---|---|---|
| Tx chain 1 | 1 | 5 | 9 | 13 | 17 |
| Tx chain 2 | 2 | 6 | 10 | 14 | 18 |
| Tx chain 3 | 3 | 7 | 11 | 15 | 19 |
| Tx chain 4 | 4 | 8 | 12 | 16 | 20 |
| CCE/REG structure, option 2 | | | | |
| Tx chain 1 | 1 | 2 | 3 | 4 | 5 |
| Tx chain 2 | 6 | 7 | 8 | 9 | 10 |
| Tx chain 3 | 11 | 12 | 13 | 14 | 15 |
| Tx chain 4 | 16 | 17 | 18 | 19 | 20 |

Figure 7:
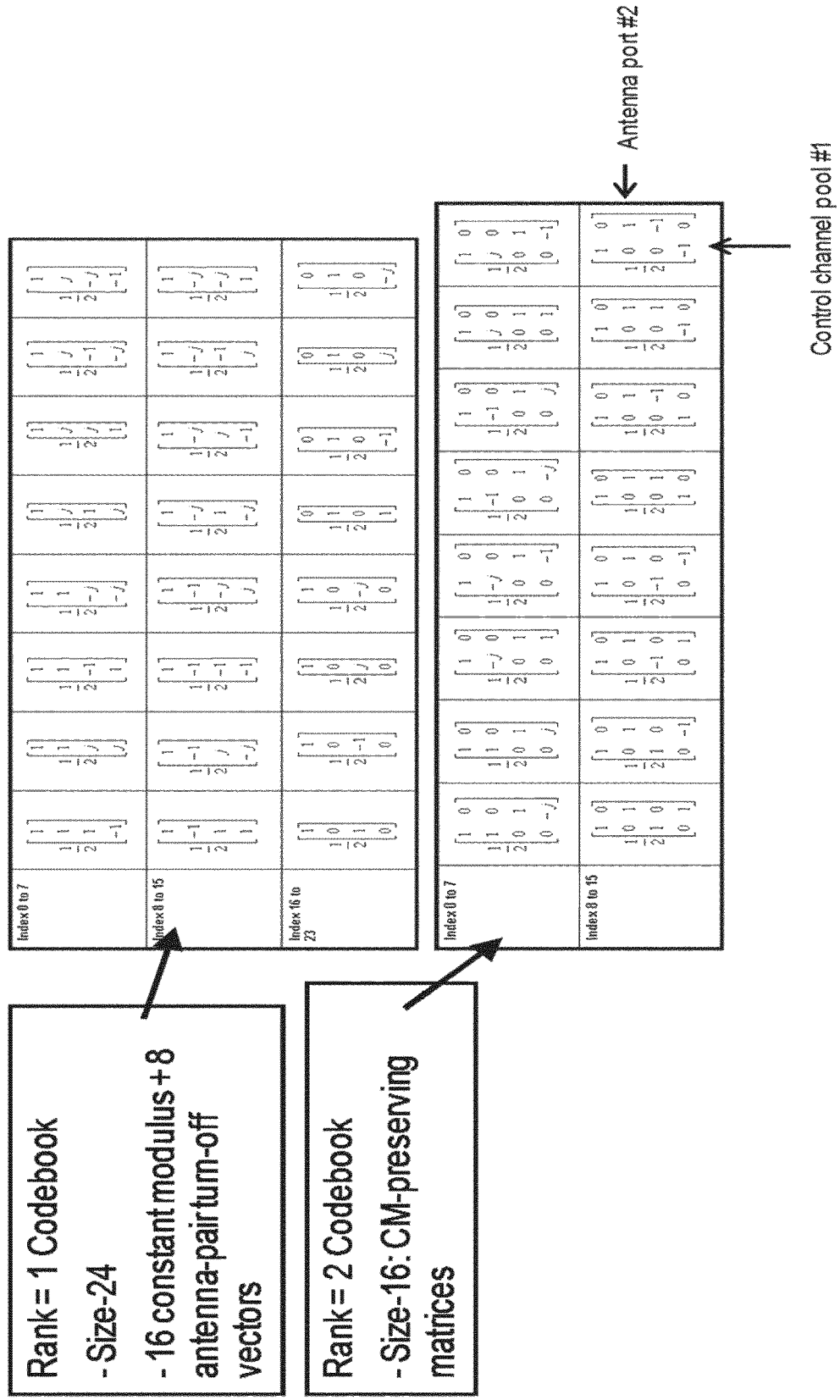
FIG. 7 illustrates an exemplary pre-coding scheme according to an embodiment of the invention.

In an embodiment, pre-coding maintaining low CM properties is applied. The pre-coding may be selected from a set of available pre-coding vectors or matrices (codebooks) for different transmission instants. According to low CM codebooks of LTE UL SU-MIMO (Rel-10), only one control channel pool is transmitted from one antenna port at a time. This is illustrated in FIG. 7, wherein LTE UL SU-MIMO codebook entries available for a case of 4 Tx antennas and 1 or 2 control channel pools are shown.

Thus, an exemplary embodiment discloses how to construct a downlink control channel for the single carrier downlink technology. An exemplary embodiment relates to the 5G radio system; it may, however, be introduced in an evolution of LTE within any new release (e.g. Rel-13/14), in a form of a new carrier type, for example. An exemplary embodiment enables power efficient single carrier transmission of the control channel in a wide area cellular system based on the single carrier downlink technology, providing a major energy efficiency improvement compared to LTE. An exemplary embodiment enables a scalable DL control channel structure for a single carrier DL system. An exemplary embodiment discloses how to maintain good performance and single carrier properties at the same time, and how to maximize commonality with LTE DL based on the OFDMA design. An exemplary embodiment involves a reasonable overhead, and a straightforward implementation that is much is simpler compared to existing downlink systems. The method is specifically attractive for massive MIMO and higher frequency scenario (such as cmWave).

Figure 9:
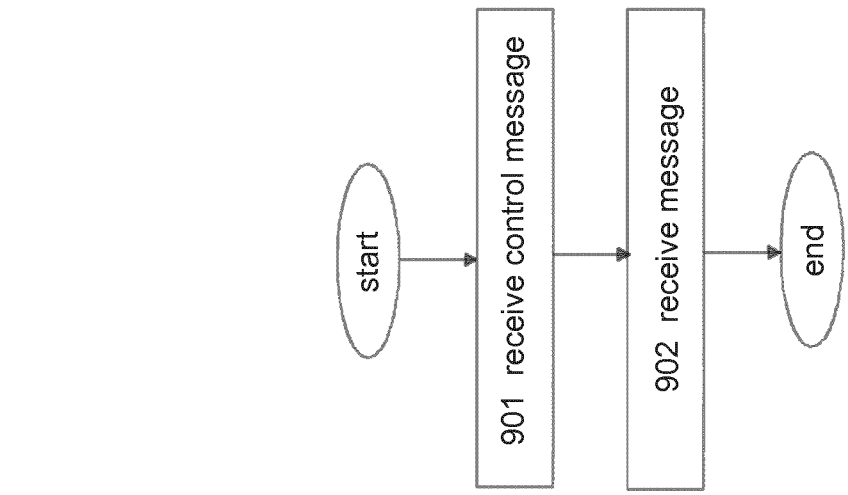
FIGS. 8 and 9 illustrate processes for providing a downlink control channel arrangement for the terminal device according to some embodiments of the invention.
Figure 8:
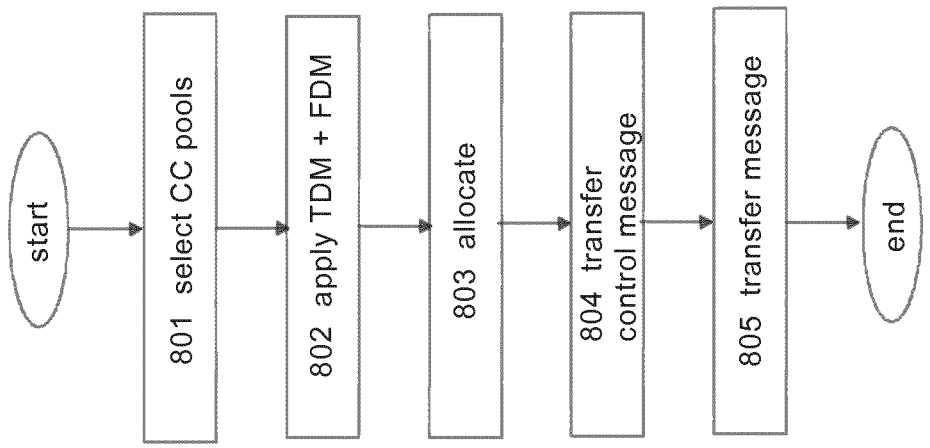

Let us now describe some embodiments with reference to FIGS. 8 and 9. FIGS. 8 and 9 illustrate embodiments for downlink control signalling. Referring to FIG. 8, in block 801, the base station selects a downlink control channel scheme comprising at least two control channel pools within predefined control symbols. In block 802, the base station applies time division multiplexing between different control channels and/or related control channel building blocks within each control channel pool. Further in block 802, the base station applies frequency division multiplexing between different control channel pools. In block 803, the base station allocates control channel resources for at least one control channel based on a control channel type and/or aggregation level. In step 804, the base station may cause transmission of a control message to the terminal device via one or more control channel pools. In step 804, the base station may cause transmission of one or more further messages to a terminal device by using a single carrier operation mode. The one or more further messages may comprise a data channel message, control channel message, a reference signal, or a signal or a message of any other suitable signal/message type.

Referring to FIG. 9, the terminal device may acquire from the base station a control message comprising at least one information element transmitted via one or more control channel pools (block 901). The terminal device may acquire from the base station one or more further messages by using a single carrier operation mode (block 902). The one or more further messages may comprise a data channel message, control channel message, a reference signal, or a signal or a message of any other suitable signal/message type.

In an embodiment, the embodiments of FIGS. 8 and 9 may be combined. For example, the base station may transmit information on the placement and size of relevant control channels, and based on the information the terminal device is able to detect these channels. In a further modification, the processes of FIGS. 8 and/or 9 may be exclusive to macro base stations, e.g. the base station 102 may carry out the embodiments of FIGS. 2 to 9 but the small cell base station 100 may not (or vice versa).

Figure 10:
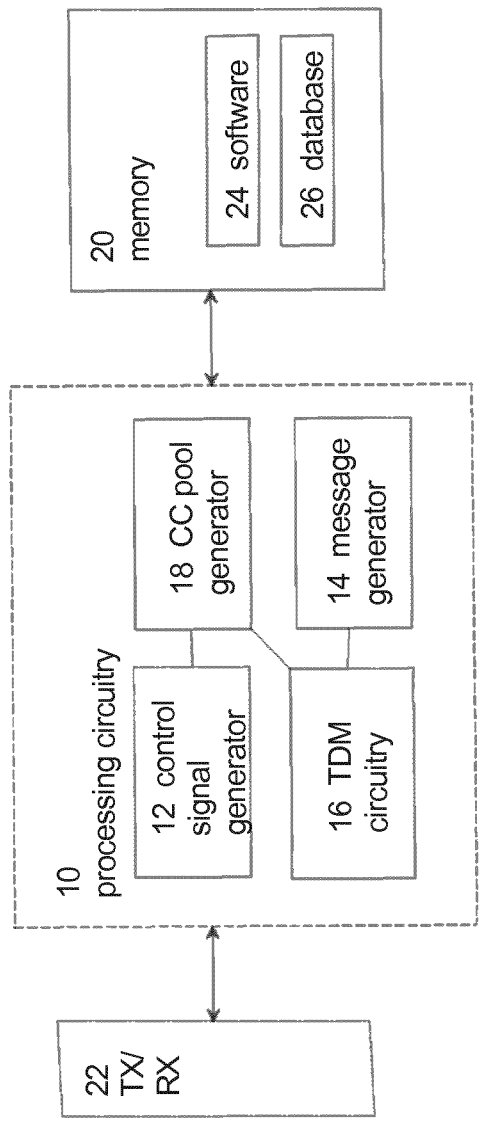
FIGS. 10 and 11 illustrate blocks diagrams of apparatuses according to some embodiments of the invention.

An embodiment provides an apparatus comprising at least one processor and at least one memory including a computer program code, wherein the at least one memory and the computer program code are configured, with the at least one processor, to cause the apparatus to carry out the procedures of the above-described base station or the network node. The at least one processor, the at least one memory, and the computer program code may thus be considered as an embodiment of means for executing the above-described procedures of the base station or the network node. FIG. 10 illustrates a block diagram of a structure of such an apparatus. The apparatus may be comprised in the base station or the network node, e.g. the apparatus may form a chipset or a circuitry in the base station or the network node. In some embodiments, the apparatus is the base station or the network node. The apparatus comprises a processing circuitry 10 comprising the at least one processor. The processing circuitry 10 may comprise a control signal generator 12 configured to create control signals to terminal devices via one or more control channel pools. The processing circuitry 10 may further comprise a control channel pool generator 18 configured to select a downlink control channel scheme comprising at least two control channel pools within predefined control symbols. A TDM circuitry 16 may be configured to apply time division multiplexing between different control channels or related control channel building blocks within each control channel pool. The TDM circuitry 16 may output to a message generator 14 information on the time division multiplexing between the control channels or the control channel building blocks within each control channel pool, and the message generator 14 may create one or more further messages to a terminal device by using a single carrier operation mode.

The processing circuitry 10 may comprise the circuitries 12 to 18 as sub-circuitries, or they may be considered as computer program modules executed by the same physical processing circuitry. The memory 20 may store one or more computer program products 24 comprising program instructions that specify the operation of the circuitries 12 to 18. The memory 20 may further store a database comprising definitions for the control channel pools, for example. The apparatus may further comprise a communication interface 22 providing the apparatus with radio communication capability with the terminal devices. The communication interface 22 may comprise a radio communication circuitry enabling wireless communications and comprise a radio frequency signal processing circuitry and a baseband signal processing circuitry. The baseband signal processing circuitry may be configured to carry out the functions of the transmitter and/or the receiver, as described above in connection with FIGS. 1 to 10. In some embodiments, the communication interface may be connected to a remote radio head comprising at least an antenna and, in some embodiments, radio frequency signal processing in a remote location with respect to the base station. In such embodiments, the communication interface 22 may carry out only some of radio frequency signal processing or no radio frequency signal processing at all. The connection between the communication interface 22 and the remote radio head may be an analogue connection or a digital connection.

Figure 11:
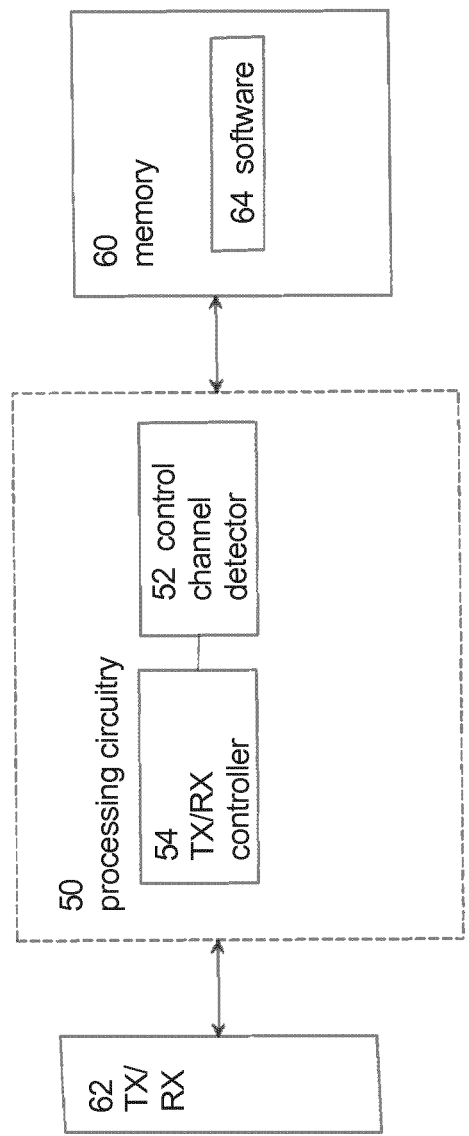

An embodiment provides another apparatus comprising at least one processor and at least one memory including a computer program code, wherein the at least one memory and the computer program code are configured, with the at least one processor, to cause the apparatus to carry out the procedures of the above-described terminal device. The at least one processor, the at least one memory, and the computer program code may thus be considered as an embodiment of means for executing the above-described procedures of the terminal device. FIG. 11 illustrates a block diagram of a structure of such an apparatus. The apparatus may be comprised in the terminal device, e.g. it may form a chipset or a circuitry in the terminal device. In some embodiments, the apparatus is the terminal device. The apparatus comprises a processing circuitry 50 comprising the at least one processor. The processing circuitry 50 may comprise a communication controller circuitry 54 configured to extract signals and messages received from a serving base station, to determine communication resources scheduled to the terminal device, e.g. frequency resource block(s) and associated transmission time intervals, and to control the terminal device to transmit or receive data between the base station in scheduled communication resources. The apparatus may further comprise a control channel detector 52 configured to detect control channels based on information received from the base station.

The processing circuitry 50 may comprise the circuitries 52, 54 as sub-circuitries, or they may be considered as computer program modules executed by the same physical processing circuitry. The memory 60 may store one or more computer program products 64 comprising program instructions that specify the operation of the circuitries 52, 54. The apparatus may further comprise a communication interface 62 providing the apparatus with radio communication capability with base stations of one or more cellular communication networks. The communication interface 62 may comprise a radio communication circuitry enabling wireless communications and comprise a radio frequency signal processing circuitry and a baseband signal processing circuitry. The baseband signal processing circuitry may be configured to carry out the functions of the transmitter and/or the receiver, as described above in connection with FIGS. 2 to 11.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 2 to 11 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

List of Abbreviations

3GPP third generation partnership project
5G 5th generation
ACK acknowledgement
CM cubic metric
CP cyclic prefix
CSI channel state information
CSS common search space
DL downlink
DVB-T digital video broadcasting terrestrial
DVT-H digital video broadcasting handheld
eNB enhanced node-B (base station)
FDM frequency division multiplexing
FDMA FDM access
HARQ hybrid automatic repeat request
ISI inter symbol interference
LTE long term evolution
MIMO multiple input multiple output
MU multi user
OBO output back-off
OFDM orthogonal frequency division multiplexing
OFDMA OFDM access
OPEX operational expenses
PA power amplifier
PAR peak-to-average ratio
PAPR peak-to-average power ratio
PRB physical resource block
PSK phase shift keying
PUSCH physical uplink shared channel
QAM quadrature amplitude modulation
RPF repetition factor
RS reference signal
SC-FDMA single carrier FDMA
SRI scheduling request indicator
SU single user
TDD time division duplex
TDM time division multiplexing
TV television
Tx transmission
UL uplink
USS user specific search space
WG working group
WLAN wireless local area network
PHICH physical HARQ indicator channel
PCFICH physical control format indicator channel
PDCCH physical downlink control channel
REG resource element group
CCE control channel element
CC control channel
Ant. antenna

The invention claimed is:

1. A method comprising:
selecting, in a network node, a downlink control channel scheme comprising at least two control channel pools within predefined control symbols;
wherein each of the two control channel pools comprising a plurality of control channel blocks, each control channel block of the plurality of control channel blocks, comprising plural resource element groups or control channel elements;
applying, in the network node, time division multiplexing between at least two control channels, or between the at least two control channel building blocks within each control channel pool;
applying, in the network node, frequency division multiplexing between the at least two control channel pools;
allocating, in the network node, control channel resources for at least one of the at least two control channels based on a control channel type and/or aggregation level; and
transmitting a message comprising at least one reference signal, wherein the at least one reference signal comprises at least one reference signal reference signal part configured to demodulate a control part, by applying interleaved frequency division multiplex between at least one of antenna ports and control channel pools, wherein a repetition factor is dimensioned according to the number of at least one of antenna ports and control channel pools, respectively.

2. The method of claim 1, further comprising, in the network node, causing transmission of one or more control signals to a terminal device via one or more control channel pools.

3. An apparatus comprising:
at least one processor; and
at least one memory including a computer program code, wherein the at least one memory and the computer program code are configured, with the at least one processor, to cause the apparatus to:
select a downlink control channel scheme comprising at least two control channel pools within predefined control symbols;
wherein each of the two control channel pools comprise a plurality of control channel blocks, each control channel block of the plurality of control channel blocks, comprising plural resource element groups or control channel elements;
apply time division multiplexing between at least two control channels or between the at least two control channel building blocks within each control channel pool;
apply frequency division multiplexing between the at least two control channel pools;
allocate control channel resources for at least one of the at least two control channels based on a control channel type and/or aggregation level; and
transmit a message comprising at least one reference signal, wherein the at least one reference signal comprises at least one reference signal reference signal part configured to demodulate a control part, by applying interleaved frequency division multiplex between at least one of antenna ports and control channel pools, wherein a repetition factor is dimensioned according to the number of at least one of antenna ports and control channel pools, respectively.

4. The apparatus of claim 3, wherein the at least one memory and the computer program code are configured, with the at least one processor, to cause the apparatus to cause transmission of one or more control signals to a terminal device via one or more control channel pools.

5. The apparatus of claim 3, wherein the at least one memory and the computer program code are configured, with the at least one processor, to cause the apparatus to cause transmission of one or more messages to the terminal device by using a single carrier operation mode.

6. The apparatus of claim 3, wherein the at least one memory and the computer program code are configured, with the at least one processor, to cause the apparatus to provide a resource element group, and a control channel element on top of the at least two control channel pools.

7. The apparatus of claim 3, wherein the at least one memory and the computer program code are configured, with the at least one processor, to cause the apparatus to provide physical downlink control channel, physical hybrid ARQ indicator channel, and physical control format indicator channel on top of a provided control channel structure.

8. The apparatus of claim 3, wherein the at least one memory and the computer program code are configured, with the at least one processor, to cause the apparatus to multiplex different downlink control channel pools among multiple antenna ports.

9. The apparatus of claim 3, wherein the at least one memory and the computer program code are configured, with the at least one processor, to cause the apparatus to apply single carrier-frequency division multiple access symbol level multiplexing between a control channel, reference signal and data channel.

10. The apparatus of claim 3, wherein the at least one memory and the computer program code are configured, with the at least one processor, to cause the apparatus to allocate one or more subframe-frequency division multiple access symbols to a control part; and/or allocate one or more subframe-frequency division multiple access symbols to a reference signal part.

11. The apparatus of claim 3, wherein the at least one memory and the computer program code are configured, with the at least one processor, to cause the apparatus to apply time division multiplexing between different control channels similarly for each antenna within each control channel pool; and perform pre-coding within the control channel pool by defining that for each antenna port, only one modulated symbol is transmitted at a time.

12. The apparatus of claim 3, wherein the at least one memory and the computer program code are configured, with the at least one processor, to cause the apparatus to create multiple parallel resource pools; map the control channels and/or the corresponding control channel building blocks into the available resource pools in a predetermined manner.

13. The apparatus of claim 12, wherein the at least one memory and the computer program code are configured, with the at least one processor, to cause the apparatus to apply interleaved frequency division multiple access as a multiplexing scheme between the parallel resource pools.

14. The apparatus of claim 12, wherein the number of parallel resources pools is equal to or less than the number of antenna ports and/or Tx chains.

15. The apparatus of claim 3, wherein the at least one memory and the computer program code are configured, with the at least one processor, to cause the apparatus to apply diversity transmission over multiple resource pools within at least one of a single control channel pool by using multiple control symbols, and multiple control channel pools by using a single control symbol.

16. The apparatus of claim 3, wherein the at least one memory and the computer program code are configured, with the at least one processor, to cause the apparatus to define that a resource element group corresponds to a predetermined number of consecutive modulation symbols; a control channel element corresponds to a predetermined number of resource element groups; and different control channels comprised of resource element groups and/or control channel elements are ordered within a control symbol in a predetermined manner.

17. The apparatus of claim 3, wherein the at least one memory and the computer program code are configured, with the at least one processor, to cause the apparatus to cause transmission of information to a terminal device, on placement and size of each control channel the terminal device is to detect.

18. A computer program product embodied on a non-transitory computer-readable medium and comprising program instructions which, when loaded into an apparatus, execute a process comprising:
    selecting, in a network node, a downlink control channel scheme comprising at least two control channel pools within predefined control symbols;
    wherein each of the two control channel pools comprise a plurality of control channel blocks, each control channel block of the plurality of control channel blocks, comprising plural resource element groups or control channel elements;
    applying, in the network node, time division multiplexing between different control channels or between the at least two control channel building blocks within each control channel pool;
    applying, in the network node, frequency division multiplexing between the at least two control channel pools;
    allocating, in the network node, control channel resources for at least one of the at least two control channels based on a control channel type and/or aggregation level; and
    transmitting a message comprising at least one reference signal, wherein the at least one reference signal comprises at least one reference signal reference signal part configured to demodulate a control part, by applying interleaved frequency division multiplex between at least one of antenna ports and control channel pools, wherein a repetition factor is dimensioned according to the number of at least one of antenna ports and control channel pools, respectively.

19. The computer program product of claim 18, wherein the process further comprising:
    multiplexing different downlink control channel pools among multiple antenna ports.

* * * * *